ent Office 3,030,177
Patented Apr. 17, 1962

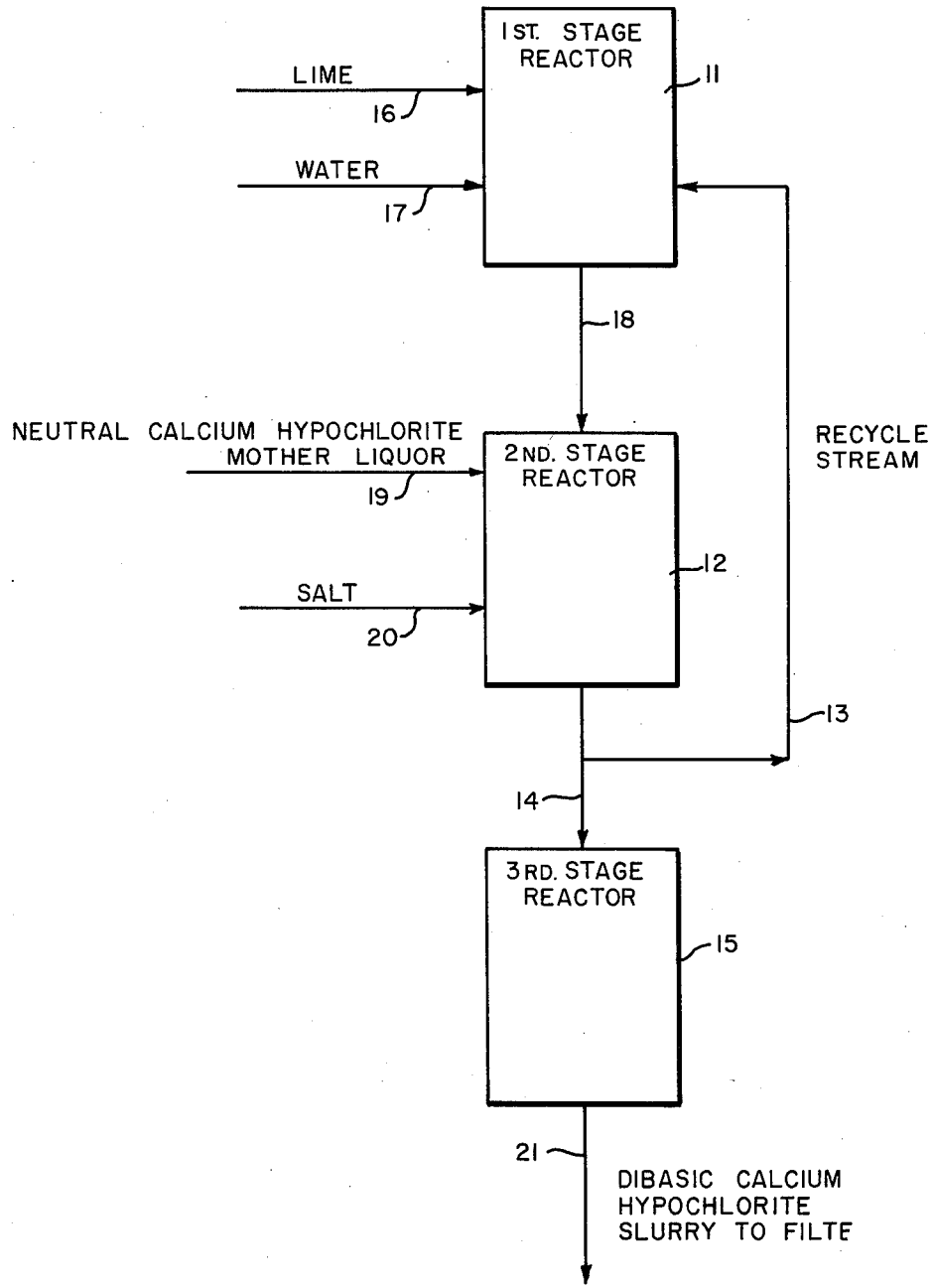

3,030,177
CONTINUOUS MULTI-STAGE PROCESS FOR PRODUCTION OF DIBASIC CALCIUM HYPOCHLORITE
Joseph C. Mohan, Jr., Plymouth Meeting, Pa., assignor to Pennsalt Chemicals Corporation, Philadelphia, Pa., a corporation of Pennsylvania
Filed Sept. 15, 1958, Ser. No. 761,077
4 Claims. (Cl. 23—86)

This invention is directed to a continuous process for the crystallization of dibasic calcium hypochlorite. In aqueous systems for the manufacture of calcium hypochlorite made by reacting lime and chlorine a neutral calcium hypochlorite crystal $Ca(OCl)_2 \cdot 2\frac{1}{2}H_2O$ is precipitated from a saturated solution at low temperatures, generally by the addition of salt in order to suppress the solubility of the calcium hypochlorite in water. After separation of the neutral calcium hypochlorite crystal, the mother liquor still retains in solution a considerable amount of calcium hypochlorite, approximately 12 grams per 100 grams of water present which must be recovered for economical operations.

It has been established that the recovery of the hypochlorite values from neutral calcium hypochlorite mother liquor is best accomplished by contacting the hypochlorite ion with hydrate of lime to form a dibasic calcium hypochlorite crystal which is then separated from the mother liquor. This separation of the dibasic calcium hypochlorite is best effected in the presence of sodium chloride which reduces the solubility of dibasic calcium hypochlorite dissolved in aqueous solution from a value of about 12 grams per 100 grams of water to approximately 2.0 grams per 100 grams of water. At this low figure further recovery of hypochlorite is uneconomical, and the liquors are generally discarded from the process.

In addition to providing a means for effectively recovering calcium hypochlorite values in aqueous solution the precipitation of a dibasic calcium hypochlorite crystal, $Ca(OCl)_2 \cdot 2Ca(OH)_2$, is of particular advantage in the preparation of a high available chlorine calcium hypochlorite product since on its chlorination it produces only 1 mol of calcium chloride for each 2 mols of calcium hypochlorite product whereas when fresh lime is chlorinated to produce calcium hypochlorite, calcium chloride is produced on a mol to mol basis.

While the crystallization of dibasic calcium hypochlorite has been practiced for many years, the crystallization process has been attended with many difficulties. Reitz and Ehlers in U.S. 2,244,477 indicate that the crystallization of dibasic generally fails owing to the fact that the precipitated dibasic calcium hypochlorite initially forms a fine powdery deposit which cakes together into a cohesive mass so that separation from the mother liquor is impractical. The patentees believed that the fine crystals were due to the presence of a calcium oxychloride which they sought to avoid by treating their solutions at high temperatures.

Sprauer in U.S. 2,441,337 in order to overcome the formation of many small dibasic crystals resorted to a seed crystallization process in which ten or more percent of the total hypochlorite which was to be recovered was initially used to form dibasic calcium hypochlorite seed crystals, and then these crystals were used to seed and grow larger dibasic crystals from the remainder of the hypochlorite. The patentee then repeated the seeding operation until crystals of a satisfactory size and high filtration rate were obtained. Generally the seed crystallization processes were not adaptable to continuous operating procedures.

Soule and Robson in U.S. 2,429,531 encountered additional difficulties in the preparation of dibasic hypochlorite in that "lumping" occurred due to the formation of a covering or crust of basic hypochlorite around unreacted lime which thereafter prevented contact of the lime with the hypochlorite ion in solution. In order to overcome the lumping of the lime and to prepare a satisfactory dibasic calcium hypochlorite crystal the patentees sought to react hypochlorous acid solution with the dibasic calcium hypochlorite crystals. Soule and Robson encountered both exceedingly fine dibasic calcium hypochlorite crystals and very large dibasic calcium hypochlorite crystals and found that neither one would filter satisfactorily. The patentees found that very small dibasic calcium hypochlorite crystals after centrifuging would yield a wet cake containing as much as 25% or more of mother liquor as well as other lime impurities.

I have now discovered a practical means for overcoming the difficulties encountered in this art and have developed a new continuous process for producing dibasic calcium hypochlorite crystals having good filtration characteristics. Broadly speaking, my invention encompasses the continuous multistage reaction of lime hydrate with hypochlorite ion under conditions in which lime cannot react with hypochlorite until the lime has been thoroughly wetted. I have overcome some of the difficulties of the prior art by reacting hydrate of lime with hypochlorite ions while the lime is slurried in dibasic calcium hypochlorite liquor saturated with sodium chloride.

In the first stage of my process hydrate of lime is slurried and wetted in a recycle stream of dibasic calcium hypochlorite coming from a later stage of the process and is thoroughly dispersed therein. It is important to my process that this slurry be relatively free of uncombined hypochlorite ions, that is, hypochlorite in solution capable of reacting with lime. The term "free of uncombined hypochlorite ions" as used in this application means a concentration of uncombined hypochlorite not exceeding three percent by weight calculated as calcium hypochlorite.

Thereafter, in a second stage the slurry of lime in dibasic calcium hypochlorite liquor is intimately mixed with hypochlorite ions conveniently obtained from the filtration of neutral calcium hypochlorite crystals. Saturation of these liquors is desirable and may be obtained by the introduction of water soluble salts such as sodium chloride or calcium chloride in order to reduce the solubility of the dibasic calcium hypochlorite crystals which are formed. The soluble chloride may be introduced into the process at any stage in the process, that is the first, second or any subsequent stage prior to withdrawal of the product stream. Most advantageously, the soluble salt is added to the second stage wherein the lime slurry is contacted with the hypochlorite ion. Other places for entry of the soluble salt into the system are with the calcium hypochlorite mother liquor or with the lime slurry in the first stage. The reaction of lime with hypochlorite ion requires carefully controlled conditions of intimate agitation and regulated temperature.

It is also important in my process that sufficient residence time be given to the reaction in order that it may approach equilibrium conditions. Sufficient reaction time may be provided in the second stage or equilibrium conditions may be obtained by providing additional stages.

Thus, as described above, the first stage of my process is one in which hydrate of lime is thoroughly wetted and dispersed in a dibasic calcium hpyochlorite liquor which is at or near its equilibrium content of dibasic calcium hypochlorite in the presence of sodium chloride. From the first stage this lime slurry is directed to a second stage in which under conditions of a vigorous agitation calcium hypochlorite ions are contacted to form dibasic calcium hypochlorite. Soluble salts may be introduced into this second stage in order to reduce the solubility of the dibasic calcium hypochlorite. Generally, additional stages are provided in order that the reaction may approach equilibrium.

The accompanying drawing is a flow sheet of one preferred embodiment of the invention.

Referring now to the drawing reference numeral 11 designates a heated first stage reactor equipped with an agitator where hydrate of lime and water are slurried in a stream of dibasic calcium hypochlorite, the latter coming from the second stage reactor designated by reference numeral 12, through the line designated by reference numeral 13. The lime is introduced to the first stage reactor by a screw conveyor designated by reference numeral 16. Water is also introduced to the first stage reactor by a line designated by reference numeral 17. The lime-dibasic calcium hypochlorite slurry leaves the first stage reactor through the line designated by reference numeral 18 and is conducted to the second stage reactor which is also a heated reactor equipped with an agitator. Neutral calcium hypochlorite mother liquor is continuously introduced into the second stage reactor through the line designated by reference numeral 19 and the hypochlorite ions contained therein are reacted with the lime in the lime-dibasic slurry which is also continuously introduced through the line designated by reference numeral 18. Salt is continuously added to the agitated reactor mass at the second stage reactor by means of a screw conveyor designated by reference numeral 20. Salt is added in a quantity sufficient to saturate the liquors. Reaction takes place readily, and the dibasic calcium hypochlorite product is continuously discharged from the second stage reactor. This product stream is divided into two parts, one a recycle stream designated by reference numeral 13 leading to the first stage reactor and the second, a product stream conducted through the line designated by reference numeral 14, which leads to the third stage reactor, the latter, being designated by the reference numeral 15. The third stage reactor is also equipped with an agitator and means to heat the reaction liquors. In the third stage reactor, the reaction between the hypochlorite ions and the calcium hydroxide is completed and equilibrium values are approached. The dibasic calcium hypochlorite product leaves the third stage reactor 15 through the line designated by reference numeral 21 and moves continuously to a further processing unit, for example, a rotary vacuum filter. All of the reactors are equipped with internal or external coils to provide heat to the reaction liquors.

As used in this specification and claims, a stage is intended to define a reaction vessel or a portion of a reaction vessel providing reactor volume. Thus, a three stage process, as discussed herein, could be three separate reaction vessels with communication of liquids from vessel to vessel, or it could be a single reaction vessel in which the reactant and product streams are so programmed that two or more stages are obtained in a single reaction vessel. In one example of my invention the first stage has comprised a single reaction vessel while a second reaction vessel was divided into a reaction section and a holding section, thus providing a total of three stages.

The slurrying of the lime and the contacting of the lime with the hypochlorite ions are undertaken under conditions providing intimate contact of the reactants. Generally, this is simply provided by anchor or turbine type agitators in reaction vessels. It is important in this crystallization process that intimate contact of reactants is obtained in order that localized concentration conditions which are non-conducive to the formation of good dibasic crystals are avoided. For example, if the lime is contacted with the hypochlorite ion under conditions where there is a localized or general excess of hypochlorite ion, exceedingly small and poorly-formed dibasic calcium hypochlorite crystals are obtained which can only be filtered with great difficulty. On the other hand where the lime slurry is contacted with a hypochlorite ion under conditions where there is an exceedingly large excess of lime, then the lime particles themselves form aggregates with the dibasic hypochlorite crystal, and this combination of product crystal containing large excesses of unreacted lime has poor filtration qualities and can only be filtered with great difficulty and with the undesirable retention of great masses of mother liquor.

Generally, the excess lime at the equilibrium state should not be more than 15% in excess and is preferably not more than 5% in excess of the theoretical amount required to precipitate all the hypochlorite present in the liquor. These figures are based on equilibrium conditions where the system is saturated with sodium chloride. It will be appreciated, of course, that the excess of lime will also be dependent on the rate of approach of the reaction to equilibrium conditions, and hence it is also dependent on overall reaction conditions and residence time. The amount of excess lime is conveniently determined by chemical analysis of the dibasic slurry product stream, and adjustments in the ratios of reactants can then be made.

While intimate contact of the reactants is necessary, it is also important to bear in mind that well-formed dibasic crystals can be ground-up and become small broken particles if the agitation is too excessive. Thus, vigorous agitation is desired, but an excess must be avoided. The amount and degree of agitation are easily determined by observing the product crystals as a function of the degree of turbulence employed through microscopic examinations.

Before the discovery of my invention it had been the practice in the recovery of calcium hypochlorite values from neutral mother liquor to sprinkle the lime hydrate on the surface of the neutral filtrate containing the hypochlorite ions. However, this practice, even under conditions of agitation, resulted in the formation of undesirable granular crystals. This granular material apparently was composed of a core of lime surrounded by a shell of dibasic calcium hypochlorite which rendered the contained portion of the lime unavailable for reaction. Thus, it is a feature of my invention that the lime is slurried and dispersed in a rapidly moving liquid stream which is unreactive with the lime.

Lime as used throughout this specification and claims is intended to mean lime in the form of calcium hydroxide or hydrate of lime. Any type of commercial lime is suitable in my process, but it is preferable to use a high purity chemical lime which usually assays at least 90% calcium hydroxide. Examples of suitable limes are Peerless LFAS Hydrate, Marblehead Hydrate, Calsate Hydrate and Gold Bond Hydrate.

The hydrate of lime which is used in my process must be finely-divided so that it is readily dispersed in the aqueous systems and can thereafter react with the hypochlorite ions without the occlusion of solid lime particles because of undesirable lumps or aggregates.

The initial stage of my multistage process must be equipped with means for introducing solid lime hydrate and means for introducing the recycle stream of dibasic calcium hypochlorite slurry coming from a later stage. The initial stage of the multistage process may conveniently be a suitable tank equipped with means for agitation of liquids and for heating the liquids. An anchor or turbine-type agitator can provide agitation while steam heating coils can supply the heat. The calcium hydrate is conveniently introduced to the surface of the liquid in the first stage by means of a lime feed screw. Preferably, the lime is spread on the surface of the liquor. The dibasic calcium hypochlorite slurry is introduced to the first stage by means of an inlet which may be positioned at any place in the initial stage but may preferably be located at the bottom of the first stage so that the flow of the dibasic calcium hypochlorite would be countercurrent to the introduction to the lime at the top of the first stage. An overflow line is a convenient means for directing the lime slurry product to the second stage. The temperature of the first stage is maintained within the range of 105 to 140° F. and preferably in the range of 113 to 120° F. Soluble chlorides may also be introduced to the first stage by means of a screw or belt conveyor.

The concentration of lime in dibasic calcium hypochlorite slurry must be controlled at a maximum concentration in order to insure thorough wetting of the lime. If the lime is not wetted and thoroughly dispersed, undesirably large dibasic calcium hypochlorite crystals will form around a lime aggregate. Such a cluster will prevent the lime from reacting with hypochlorite and will filter very slowly if at all. The overall lime concentration should not exceed 25% by weight and preferably should not exceed 20% by weight.

The second stage of the crystallizer must provide reaction space for the contact of the lime with the hypochlorite ion in the liquid phase. Agitation is conveniently provided by means of an anchor-type or other type agitators. The slurry of lime and dibasic calcium hypochlorite is conveniently brought in at the top of the second stage. The hypochlorite ions, usually obtained as the filtrate from the neutral calcium hypochlorite filtration, may be brought into the top of the second stage. The soluble salts may be directed into the top of the second stage conveniently by means of a salt screw feeder. The product streams and the recycle dibasic stream are conveniently removed from the bottom of the second stage by means of diaphragm or other type pumps. In the second stage the lime slurry is contacted with the hypochlorite ions under conditions of vigorous agitation and under conditions of controlled temperature. The temperature may be controlled by the use of internal and/or external heating coils. Sufficient time must be provided in the second stage for the reaction to reach equilibrium or this may be done by directing liquors from the second stage into subsequent stages where additional reaction time is provided under conditions prevailing in the second stage, that is, under conditions of agitation and controlled temperature. Sufficient residence time must be provided in the system so that the reaction approaches equilibrium in order that as complete recovery of the hypochlorite ions as possible is obtained. If equilibrium is not reached, the filtrate from the product slurry of the dibasic calcium hypochlorite, which is usually discarded, carries away valuable hypochlorite materials.

In one form of my invention the second stage tank was provided with a baffle arrangement which divided the second stage into two separate tanks with the reactant materials coming into one part of the tank forming a second stage. The reaction products then flowed underneath the baffle into a holding section which became a third stage of my process.

The operation of my multistage process will be realized from the following description. A mixture of neutral filtrate and pressed filtrate liquors was measured in a liquid measuring system and directed into the top of the second stage of my process. Lime from a weighing scale was continuously directed onto the surface of the liquor in the first stage. This liquor was dibasic calcium hypochlorite under agitation and under controlled temperature at approximately 117° F. The lime was proportioned into the first stage of the process in proportion to the volume of neutral filtrates fed into the second stage of the process. The lime hypochlorite ratio of the reactant materials was adjusted so that a slight excess of lime was present after equilibrium conditions had been reached. The amount of excess lime was usually in the range of 5% although concentrations as high as 15% and as low as 1% were found useful.

A fixed volume of dibasic calcium hypochlorite slurry was recycled from the bottom of the second stage into the first stage in order that the lime could be wetted and slurried therein. Preferably, the dibasic slurry was introduced into the bottom of the first stage. From the bottom of the second stage the remainder of the dibasic liquors containing the dibasic calcium hypochlorite crystals with slight excess of lime was directed into the bottom of the third stage and allowed to overflow from the top into a sump pump which pumped the product slurry to the filtration equipment. Any unreacted hypochlorite, generally no more than one percent or less above the equilibrium value, was allowed to finish reaction and approach equilibrium in the third stage. Salt was introduced into the process in an amount to saturate the liquors at the top of the second stage. The point at which the soluble salt is introduced must be chosen so that time is provided for the salt to dissolve and thereby reduce the solubility of the dibasic calcium hypochlorite.

In designing any system for the manufacture of hypochlorite it must be realized that the hypochlorite ions are very corrosive to many surfaces including steel and that generally surfaces which are inert to the hypochlorite ion must be provided. Satisfactory coatings for surfaces in contact with the hypochlorite are polyvinyl chloride and neoprene. Glass of course is inert to the hypochlorite ion.

It is important in my process that the reaction temperature be maintained at not below 105° F. It has been my experience that below this temperature basic calcium chloride ($CaCl_2 \cdot 3Ca(OH)_2 \cdot 13H_2O$) will tend to precipitate out and will contaminate the dibasic calcium hypochlorite product. Preferably, the temperature is maintained between 113 and 120° F. although temperatures as high as 140° F. are useful. Temperatures higher than 140° F. are undesirable because of decomposition of the product and the tendency to form excessively large crystals which do not chlorinate readily. The above temperatures apply to all stages of the multistage process.

The following three production runs illustrate the practice of my invention in a three stage system. Various size stages were used in order to secure an optimum residence time in order that the reject calcium hypochlorite liquor from the process would be as close to equilibrium conditions as was practical to obtain.

TABLE 1

*Continuous Dibasic Crystallization*

| Run Number | 1 | 2 | 3 |
|---|---|---|---|
| Volume of 1st Stage (gal.) | 17 | 17 | 17 |
| Volume of 2nd Stage (gal.) | 15 | 30 | 45 |
| Volume of 3rd Stage (gal.) | 15 | 30 | 45 |
| Total Volume (gal.) | 47 | 77 | 107 |
| Mother liquor feed rate to 2nd stage, Gal./Hour | 40 | 40 | 40 |
| Salt feed rate to 2nd stage, Pounds/Hour | 17 | 17 | 17 |
| Lime (Peerless) Feed Rate (1st stage) Pounds/Hour | 33 | 33 | 33 |
| Dibasic Recirculating rate from Second Stage to First Stage: | | | |
| Gal/Hour | 40 | 40 | 40 |
| Pounds/Hour | 440 | 440 | 440 |
| Yield of hypochlorite crystallized as dibasic calcium hypochlorite as percent of amount theoretical recoverable | 94.2 | 94.5 | 96.3 |
| Residence Time (Hours) | 1.175 | 1.92 | 2.67 |
| Temperature ° F | 120 | 118 | 113 |
| Analytical Data: | | | |
| $Ca(OCl)_2$ in neutral mother liquor (percent) | 7.54 | 7.85 | 7.93 |
| $Ca(OCl)_2$ in reject liquor (percent) | 1.74 | 1.68 | 1.58 |
| Total Chlorine in neutral mother liquor (percent) | 17.3 | 17.8 | 18.2 |

TABLE 2
Continuous Dibasic Crystallization

| Elapsed Time Hours | Act. Anal. Rej. Liq. | | | Calc. Anal. Rej. Liquor | | | Pounds Per 100 Pounds H₂O | | | | Yield as Percent Theory (7) |
|---|---|---|---|---|---|---|---|---|---|---|---|
| | Percent Ca(OCl)₂ | Percent Tot. Cl₂ | Percent Cl⁻ (1) | Percent CaCl₂ (2) | Percent NaCl (3) | Percent H₂O (4) | Act. Rej. Ca(OCl)₂ (5) | Liq. CaCl₂ | Theo. R. L. Ca(OCl)₂ (6) | Theo. M. L. Ca(OCl)₂ (6) | |

RUN NO. 1.—TOTAL VOL. OF MULTISTAGES—47 GALS.

| 1.0 | 1.76 | 17.20 | 16.33 | 8.58 | 17.90 | 71.76 | 2.45 | 11.95 | 1.93 | 11.05 | 93.3 |
| 2.0 | 1.75 | 17.15 | 16.28 | 8.54 | 17.85 | 71.86 | 2.44 | 11.90 | 1.84 | 11.05 | 93.4 |
| 2.5 | 1.75 | 16.95 | 16.08 | 8.44 | 17.62 | 72.19 | 2.42 | 11.70 | 1.86 | 11.05 | 94.3 |
| 3.0 | 1.74 | 17.05 | 16.19 | 8.50 | 17.75 | 72.01 | 2.41 | 11.82 | 1.85 | 11.05 | 94.0 |

RUN NO. 2.—TOTAL VOL. OF MULTISTAGES—77 GALS.

| 1.0 | 1.63 | 17.8 | 16.99 | 8.92 | 18.6 | 70.85 | 2.30 | 12.60 | 1.75 | 10.9 | 94.0 |
| 1.5 | 1.56 | 17.1 | 16.32 | 8.56 | 17.9 | 71.98 | 2.17 | 11.90 | 1.84 | 11.05 | 96.5 |
| 2.0 | 1.64 | 17.0 | 16.18 | 8.50 | 17.75 | 72.11 | 2.28 | 11.80 | 1.86 | 11.1 | 93.3 |
| 2.5 | 1.69 | 17.05 | 16.21 | 8.50 | 17.75 | 72.05 | 2.35 | 11.82 | 1.86 | 11.1 | 94.5 |
| 3.0 | 1.68 | 17.2 | 16.37 | 8.60 | 17.95 | 71.72 | 2.34 | 12.00 | 1.83 | 11.0 | 94.4 |

RUN NO. 3.—TOTAL VOL. OF MULTISTAGES—107 GALS.

| 1.0 | 1.41 | 17.05 | 16.35 | 8.60 | 17.95 | 72.04 | 1.96 | 11.95 | 1.83 | 11.05 | 98.7 |
| 2.0 | 1.58 | 17.18 | 16.40 | 8.61 | 18.00 | 71.81 | 2.20 | 12.00 | 1.83 | 11.0 | 96.0 |
| 3.0 | 1.50 | 17.0 | 16.25 | 8.54 | 17.80 | 72.16 | 2.08 | 11.84 | 1.85 | 11.05 | 97.5 |
| 4.0 | 1.52 | 16.15 | 16.39 | 8.61 | 18.00 | 71.87 | 2.12 | 11.98 | 1.83 | 11.0 | 96.8 |
| 5.0 | 1.56 | 17.05 | 16.28 | 8.55 | 17.85 | 72.04 | 2.17 | 11.90 | 1.84 | 11.05 | 96.4 |
| 6.0 | 1.60 | 17.10 | 16.30 | 8.55 | 17.90 | 71.95 | 2.22 | 11.09 | 1.84 | 11.05 | 96.0 |
| 7.5 | 1.58 | missing | | | | | | | | | |
| 8.0 | 1.59 | 17.10 | 16.32 | 8.57 | 17.92 | 71.93 | 2.20 | 11.90 | 1.84 | 11.05 | 96.1 |
| 8.5 | 1.58 | 16.94 | 16.16 | 8.48 | 17.70 | 72.24 | 2.19 | 11.75 | 1.86 | 11.05 | 96.5 |

¹ Chloride ion equals total chlorine minus 0.497×Ca(OCl)₂.
² CaCl₂ is calculated using a factor which represents the distribution of chloride ion between CaCl₂ and NaCl in the reject liquor. Factor F₁ × percent Cl⁻ = percent CaCl₂   F₁=0.525.
³ NaCl is calculated as in (2) above. Factor F₂× percent Cl⁻ = percent NaCl   F₂=1.095.
⁴ Water equals 100−Sum Ca(OCl)₂+CaCl₂+NaCl.
⁵ Percent Ca(OCl)₂ times 10₀ divided by percent H₂O (for reject liquor).
⁶ Value obtained from Orrison equilibrium curves.
⁷ Yield of hypochlorite crystallized as dibasic calcium hypochlorite as percent of amount theoretical recoverable.
Act.=actual; Anal.=analysis; Calc.=calculated; Liq.=liquor; M. L.=mother liquor; Rej.=reject; Theo.=theoretical; Tot.=total; Vol.=volume.

From the above production runs it is seen that a residence time of 1.175 hours provided a recovery of hypochlorite ions of only 94.2% in a three stage operation. With a residence time of 1.92 hours, little increase was noted in a three stage system; however, when the residence time was increased to 2.67 hours, the recovery of the calcium hypochlorite ion increased to over 96%. Thus, for maximum recovery it is necessary in my process that a residence time of at least 2.67 hours be provided. Of course, additional residence time may be provided but the increase in recovery will not be proportional to the increase in residence time as the equilibrium point is reached. This minimum residence time may be provided by a two stage system or a system with a greater number of stages.

A typical calcium hypochlorite mother liquor feed to the dibasic recovery system would be 70.2% water, 8.75% calcium hypochlorite, 14.1% sodium chloride, 5.9% calcium chloride and 0.8% other. The composition of a typical recycle dibasic stream would be 63.3% water, 7.3% calcium hypochlorite and 6.3% calcium hydroxide as dibasic calcium hypochlorite with some excess lime, 15.3% sodium chloride, 7.3% calcium chloride and 0.5% other. The composition of the reject liquor discarded from the system after the dibasic calcium hypochlorite filtration would be 72.5% water, 1.8% calcium hypochlorite, 17.9% sodium chloride, 7.6% calcium chloride and 0.3% other.

A typical material balance around the dibasic calcium hypochlorite system under continuous three stage operation is indicater below. All figures are in pounds or percentage where indicated.

TABLE 3
Material Balance Over Dibasic System
[Peerless Lime used]

| Description of Items | Total | Components | | |
|---|---|---|---|---|
| | | Hypochlorite | Total Cl₂ | Ca(OH)₂ |
| Inputs: | | | | |
| Neutral mother liquor | 2,333 | 179.2 | 425 | |
| Lime | 171 | | | 162 |
| Salt | 51 | | 31 | |
| Total input | 2,555 | 179.2 | 456 | 162 |
| Outputs: | | | | |
| Dibasic cake | 543 | 152 | 118.3 | 155 |
| Reject liquor | 1,995 | 34.9 | 3.1 | 3.7 |
| Filter pan (mt at start) | 17 | 1.5 | 338.0 | 1.6 |
| Total output | 2,554 | 188.4 | 459.4 | 160.3 |
| Accountability, percent | 100 | 105 | 100.7 | 98.9 |
| Recovery (percent of component) charged recovered in cake | 21.2 | 85 | 26.0 | 95.8 |

Lb. cake/lb. reject liquor=0.272.
mt (refers to empty).

I have discovered that by continuous crystallization in a multistage system both exceedingly small and exceedingly large crystals of dibasic calcium hypochlorite are avoided and that crystals of uniform shape and good filterability are obtained. Importantly, it was found that the ratio of fines to the ratio of well formed crystals was at a very minimum under continuous multistage operation. This is due to the uniform composition of the reactant streams going to the dibasic recovery system made possible by the close proportioning control of the reactants in the multistage system.

I claim:

1. A continuous two-stage process for the production of dibasic calcium hypochlorite by the reaction of hydrated lime and hypochlorite ions comprising in a first stage, continuously proportioning a solid finely-divided hydrated lime into a recycle stream of dibasic calcium hypochlorite slurry free of uncombined hypochlorite ions and intimately mixing them continuously to form a lime-dibasic calcium hypochlorite slurry containing not in excess of 25% by weight of hydrated lime, continuously introducing the said lime-dibasic slurry into a second stage of the process, continuously proportioning into the second stage an aqueous solution of hypochlorite ions in an amount to provide an excess of 1 to 15% by weight lime over the theoretical amount required to react with all of the hypochlorite ions and intimately mixing the said ions with the said lime-dibasic slurry to form additional dibasic calcium hypochlorite and continuing the reaction of the said lime with the said hypochlorite ions for at least 2 hours, continuously introducing sodium chloride into either of the process stages, and thereafter continuously withdrawing a slurry of dibasic calcium hypochlorite free of uncombined hypochlorite ions which is divided into a product stream and the said recycle stream of dibasic calcium hypochlorite, the said process being controlled within the temperature range of 105 to 140° F.

2. The process of claim 1 in which sufficient sodium chloride is added to saturate the liquors.

3. The process of claim 1 in which the hydrated lime is added to the recycle stream of dibasic calcium hypochlorite slurry by sifting it onto the surface of the liquor.

4. The process of claim 1 in which the two-stage operation is conducted in a single reactor.

References Cited in the file of this patent

UNITED STATES PATENTS 2,441,337     Sprauer _____ May 11, 1948